(12) United States Patent
Zhong et al.

(10) Patent No.: US 8,926,937 B2
(45) Date of Patent: Jan. 6, 2015

(54) HIGHLY DISPERSED METAL CATALYSTS

(75) Inventors: Ziyi Zhong, Jurong Island (SG); Jianyi Lin, Jurong Island (SG)

(73) Assignee: Agency for Science, Technology and Research, Singapore (SG)

( * ) Notice: Subject to any disclaimer, the term of this patent is extended or adjusted under 35 U.S.C. 154(b) by 861 days.

(21) Appl. No.: 12/085,066

(22) PCT Filed: Nov. 13, 2006

(86) PCT No.: PCT/SG2006/000346
§ 371 (c)(1),
(2), (4) Date: Sep. 2, 2009

(87) PCT Pub. No.: WO2007/055663
PCT Pub. Date: May 18, 2007

(65) Prior Publication Data
US 2010/0008840 A1    Jan. 14, 2010

Related U.S. Application Data

(60) Provisional application No. 60/736,259, filed on Nov. 14, 2005.

(51) Int. Cl.
*C01B 13/14* (2006.01)
*B01J 21/16* (2006.01)
(Continued)

(52) U.S. Cl.
CPC .............. *B01D 53/864* (2013.01); *B01J 31/04* (2013.01); *B01J 37/16* (2013.01);
(Continued)

(58) Field of Classification Search
None
See application file for complete search history.

(56) References Cited

U.S. PATENT DOCUMENTS 6,656,436 B1 * 12/2003 Sentagnes et al. ............ 422/186
7,053,021 B1    5/2006 Zhong et al.
(Continued)

FOREIGN PATENT DOCUMENTS

EP    0 499 402 A1    8/1992
EP    1522341 A1    4/2005
(Continued)

OTHER PUBLICATIONS

Grunwaldt, Jan-Dierk, et al. "Preparation of Supported Gold Catalysts for Low Temperature CO Oxidation via 'Size Controlled' Gold Colloid" Journal of Catalysis 181, 223-232 (1999).*

*Primary Examiner* — Melvin C Mayes
*Assistant Examiner* — Sheng H Davis
(74) *Attorney, Agent, or Firm* — Kilpatrick Townsend & Stockton LLP

(57) ABSTRACT

The present invention relates to a novel method for preparing a new type of catalyst for the oxidation of CO in a reactant gas or air. The method provides the preparation of a catalyst having nano-sized metal particles and a capping agent deposited on a solid support. The size and distribution of the metal particles can be easily controlled by adjusting reaction condition and the capping agent used. The catalyst prepared has high activity at low temperature toward selective oxidation of CO and is stable over an extended period of time. The catalyst can be used in air filter devices, hydrogen purification processes, automotive emission control devices (decomposition of NOx, x is the integer 1 or 2), F-T synthesis, preparation of fuel-cell electrode, photocatalysis and sensors.

17 Claims, 10 Drawing Sheets

(51) Int. Cl.
*B01J 31/00* (2006.01)
*B01J 23/00* (2006.01)
*C09K 3/00* (2006.01)
*B01D 53/86* (2006.01)
*B01J 31/04* (2006.01)
*B01J 37/16* (2006.01)
*B01D 53/94* (2006.01)
*B01J 31/02* (2006.01)
*B01J 31/06* (2006.01)
*B01J 23/89* (2006.01)
*B01J 23/52* (2006.01)
*B01J 23/42* (2006.01)
*B01J 35/00* (2006.01)

(52) U.S. Cl.
CPC ............ *B01J 35/006* (2013.01); *B01D 53/944* (2013.01); *B01J 31/0237* (2013.01); *B01J 35/0013* (2013.01); *B01J 31/02* (2013.01); *B01J 31/06* (2013.01); *B01D 2255/106* (2013.01); *B01J 31/065* (2013.01); *B01J 23/8906* (2013.01); *B01J 2231/70* (2013.01); *B01J 23/52* (2013.01); *B01J 23/42* (2013.01)
USPC .......... 423/592.1; 502/83; 502/150; 502/300; 516/95

(56) References Cited

U.S. PATENT DOCUMENTS

| | | | |
|---|---|---|---|
| 7,208,439 B2 * | 4/2007 | Zhong et al. | 502/185 |
| 2002/0061273 A1 | 5/2002 | Lin et al. | |
| 2003/0121364 A1 | 7/2003 | Sun | |
| 2004/0197638 A1 | 10/2004 | McElrath | |
| 2005/0032635 A1 * | 2/2005 | Yu et al. | 502/180 |
| 2005/0065026 A1 | 3/2005 | Okubo | |
| 2005/0121044 A1 | 6/2005 | Banerjee | |
| 2005/0235776 A1 * | 10/2005 | He et al. | 75/255 |
| 2005/0287560 A1 * | 12/2005 | Garimella et al. | 435/6 |
| 2006/0099483 A1 * | 5/2006 | Min et al. | 429/40 |
| 2009/0155875 A1 * | 6/2009 | Berry et al. | 435/168 |

FOREIGN PATENT DOCUMENTS

| | | |
|---|---|---|
| WO | WO 02/095098 A1 | 11/2002 |
| WO | 03/047750 A1 | 6/2003 |
| WO | WO 03/064037 A1 | 8/2003 |
| WO | WO 2005/102513 A | 11/2005 |
| WO | WO 2006/065138 A | 6/2006 |
| WO | WO 2006/078352 A2 | 7/2006 |
| WO | WO 2007/001418 A2 | 1/2007 |

* cited by examiner

HIGHLY DISPERSED METAL CATALYSTS

CROSS-REFERENCES TO RELATED APPLICATIONS

This application claims the priority to U.S. Provisional Patent Application No. 60/736,259, filed Nov. 14, 2005, which is hereby incorporated by reference in its entirety for all purposes.

BACKGROUND OF THE INVENTION

Nanotechnology has generated a great impact on materials, microelectronics, computing, pharmaceuticals, medicinal, environmental, energy and the chemical industries. Nanocatalysts are an important part of nanotechnology which have found increasing commercial applications. Suitable areas include pollution and emission control technologies, such as automotive pollution abatement, catalytic removal of volatile organic compounds (VOCs) in indoor environment and low temperature air purification. Applications include, for example, using mask filters to burn CO at room temperature, chemical processing of a range of bulk and specialty chemicals, sensors to detect poisonous or flammable gases or substances in solution, and the emerging hydrogen economy for clean hydrogen production and fuel cell systems (see, Corti, C. W., et al. *Applied Catalysis A: General*, 2005, 291, 253).

Fuel cells offer highly efficient energy conversion with negligible pollutant emissions, which have great potential and are expected to be widely used within 10 years around the world. However, current fuel cell technology requires that the hydrogen ($H_2$) gas used in the fuel cells, especially in Polymer Electrolyte Membrane Fuel Cells (PEMFC) have high purity to avoid poisoning the platinum (Pt) electrodes. This requirement means the CO concentration in the $H_2$ gas should be less than 50 ppm or even 10 ppm. To achieve this goal, the $H_2$ used for fuel cells must be pre-purified to remove the trace amount of CO and it is preferable that the process be carried out through a catalytic process.

Noble metal nanoparticles, including Au-based nanoparticles, are known to be catalytically active and potentially useful for the purification of $H_2$ for fuel cell applications. In particular, Au-based catalysts have good activity at low temperature for selective oxidation of CO. In addition, Au has the advantage of relatively low cost compared to other noble metals, such as platinum and palladium (Pd). Despite the activity in oxidizing carbon monoxide, Au-based catalysts cannot be commercialized due to its short lifetime and the catalytic efficiency of the catalyst. The factors affecting the lifetime of the catalyst include an insufficient interaction between gold particles and the support. Recent studies have shown the catalytic activity of the metal particles is dependent on the size of the metal particles, the support used and the method of preparation (see, Haruta, M. *Catalysis Today,* 1997, 36, 153; Valden, M. et al. *Science,* 1998, 281, 1647; Grunwaldt, J. D., et al. *J. of Catalysis,* 1999, 181, 223;). In general, metal nanoparticles with well-controlled size/distribution on a solid support exhibit higher activity. The stability of the nanoparticles remains an area of intensive research interest. A method for the preparation of nanoparticle catalysts that have high activity, good stability and are readily produced on various solid supports is very desirable.

Traditional methods for the catalyst preparation include impregnation, incipient wetness, co-precipitation (CP) (see, Yuan, Y. et al. *J. Catal.* 1997, 170, 191; Gardner S. D. et al., *Langmuir,* 1991, 36, 153; Haruta, M. *Catal. Today,* 1997, 36, 153) and deposition-precipitation (see, Haruta, M. et al. *J. Catal.* 1993, 144, 175; Genus, J. W., In *Preparation of Catalysts III* (Poncelet, G. et al. Eds.), Elsevier, Amsterdam, 1983, p. 1; Zanella, R. et al. *J. Phys. Chem. B* 2002, 106, 7634). Impregnation and incipient wetness techniques provide poor control on Au particle size with a limited Au loading. The complete removal of chloride anion, an inhibitor to the catalyst, is also proven to be difficult (see, Ponec, V. et al., Catalysis by metals and alloys, Amsterdam 1996; Galvagno, S. et al., *J. Catal.,* 1978, 55, 178; Cant, N. W., et al. *J. Phys. Chem.* 1971, 75, 178; Schwank, J. et al. *J. Catal.,* 1980, 61, 19; Blick, K. et al. *Catal. Lett.,* 1998, 50, 211; Sermon, P. A. et al. *J. Chem. Soc. Faraday Trans. I,* 1979, 40, 175). Co-precipitation (CP) and deposition-precipitation techniques, which use $HAuCl_4$ as a precursor, can produce a highly active catalyst with high Au loading, especially when urea is used as a precipitation agent (~8 wt %). However, the method has the limitation of consuming large quantities of water, and the reaction is carried out with heating at a high temperature ($\geq 80°$ C.) from one to several hours. Since the particles are typically produced through extensive heating at an elevated temperature, solid supports materials are limited under the high temperature process. There is also a need to improve the stability of the catalysts against calcinations. Other methods including cationic adsorption or use of organogold complex are more expensive compared with the above methods. Sputtering and laser ablation methods can provide good control on Au particle size, but the apparatus can be quite expensive and the scale-up of the production is difficult (See, Fan, L. et al. In *Studies In Surface Science and Catalysis* 132 (Iwasawa, Y. et al. Editors) p. 769).

For the foregoing reasons, there is a need to develop a new method for the preparation of a highly active and stable metal nanoparticle catalyst with well-controlled size/distribution for CO oxidation. The method should be simple and versatile for depositing the metal nanoparticles onto various solid supports. The present invention meets these and other needs.

SUMMARY OF THE INVENTION

The present invention provides a highly efficient and stable catalytic system that is capable of removing trace amounts of carbon monoxide (CO) presented in a gas, such as air, or a hydrogen containing gas at a low temperature, the method of making such a system, and the use of the catalytic system.

According to the present invention, a catalytic system is provided for conversion of CO, comprising a plurality of metal particles and a capping agent disposed on a solid support. The size of the metal particles has a distribution from approximately 2 nm to 5 nm. In one aspect, the metal particles are gold. (Au) nanoparticles and the solid support is a metal oxide, such as $Al_2O_3$, CuO, $TiO_2$, $Fe_2O_3$, $CeO_2$, zeolite and the like. The capping agent is preferably an amino acid.

In another aspect, the present invention provides a method of preparing a highly dispersed metal nanoparticle catalyst. The method typically includes contacting a metal precursor with a reducing agent and a capping agent to generate a reaction mixture, sonicating the reaction mixture to afford a plurality of metal particles and depositing the metal particles onto a solid support to prepare a highly dispersed catalyst. In one embodiment, the present invention provides a method of preparing a highly dispersed metal nanoparticle catalyst. The method includes contacting a metal precursor with a capping agent and a catalyst support to generate a reaction mixture, sonicating the reaction mixture and adding a reducing agent during the sonication to afford a plurality of metal particles and depositing the metal particles onto a solid support to prepare a highly dispersed catalyst.

In yet another aspect, the present invention provides the use of the catalysts prepared in the selective removal of CO. In one aspect, the catalysts are used to remove CO in air and in a reactant gas. In another aspect, the catalysts are used in a breathing device, such as a mask filter.

These and other objects, features and embodiments will become more apparent when read with the accompanying figures and detailed description which follows.

DETAILED DESCRIPTION OF THE INVENTION

The present invention provides a novel method for preparing a metal nanoparticle catalyst that has well-controlled particle sizes/distribution, good stability and high catalytic activity and selectivity for reactions including, but not limited to, CO oxidation, water gas shift reaction, decomposition of NOx (wherein x is an integer from 1 to 2), Fischer Tropsh (F-T) synthesis, among many other reactions.

The term "nanoparticles" as used herein refers to particles that have an average dimension between about 1 nm to 100 nm. Nanoparticles have an intermediate size between individual atoms and macroscopic bulk solids.

I. General

The present invention provides a novel method of preparing a highly dispersed noble metal catalyst having metal nanoparticles and a capping agent disposed on a metal oxide support, for example, the capping agent can attach to the surface or deposit on the support. The method is simple and versatile. In one aspect of the invention, the catalyst prepared exhibits high reactivity at low temperatures for CO oxidation and is stable over an extended period of time. Suitable applications include various breathing devices, sensors and catalysts.

Figure 1:
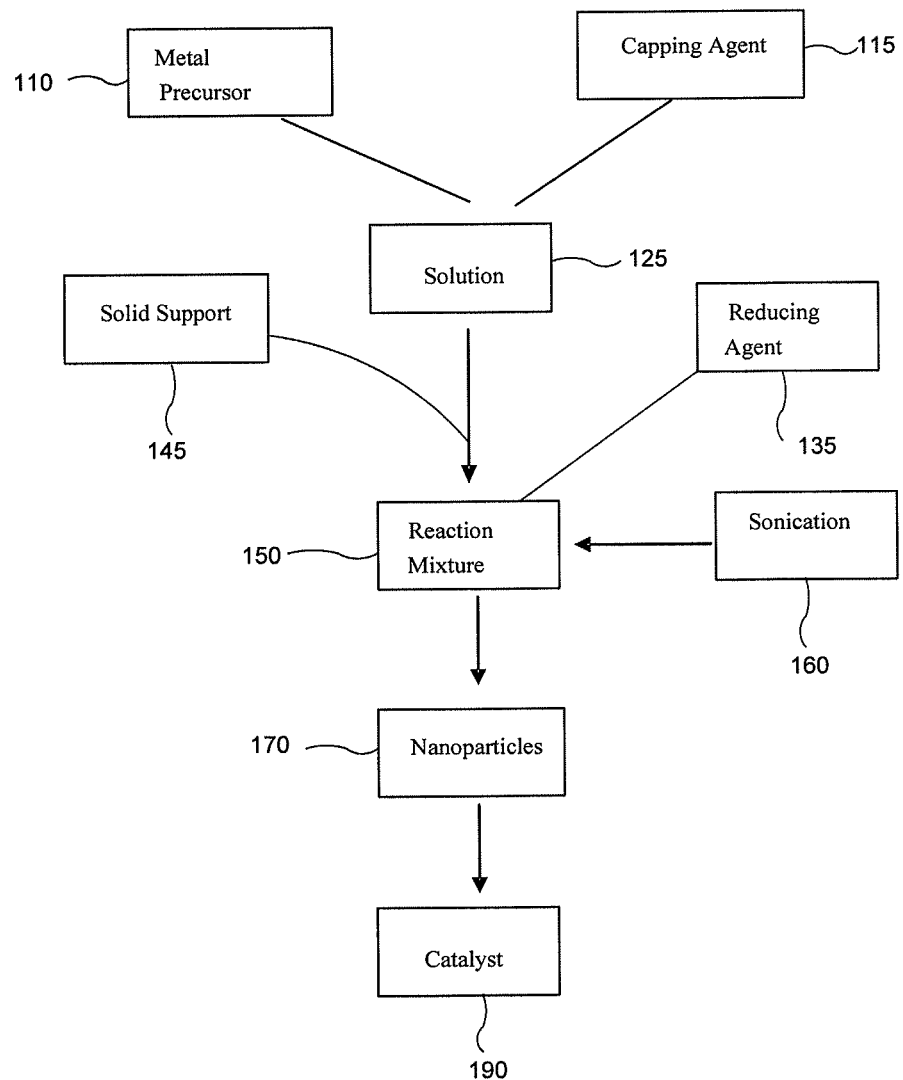
FIG. 1. Schematic showing the process of the present invention in the preparation of nanoparticles catalyst.
Figure 2:
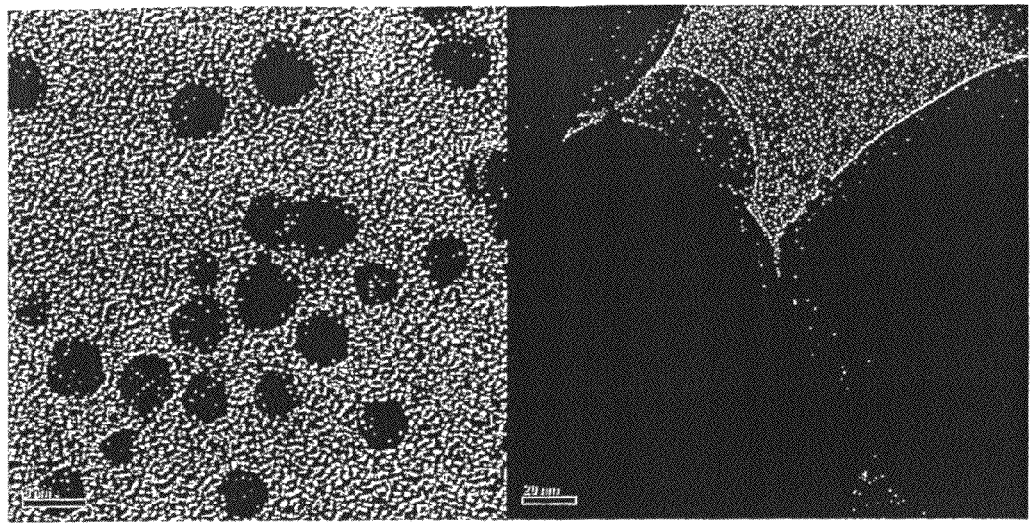
FIG. 2 shows transmission electron microscopy (TEM) images of Au colloidal particles and a supported Au catalyst ($Au/TiO_2$). The Au particles are well controlled in the range of 3-5 mm. (A) Au colloids in solution, and (B) Au particles supported on $TiO_2$.
Figure 3:
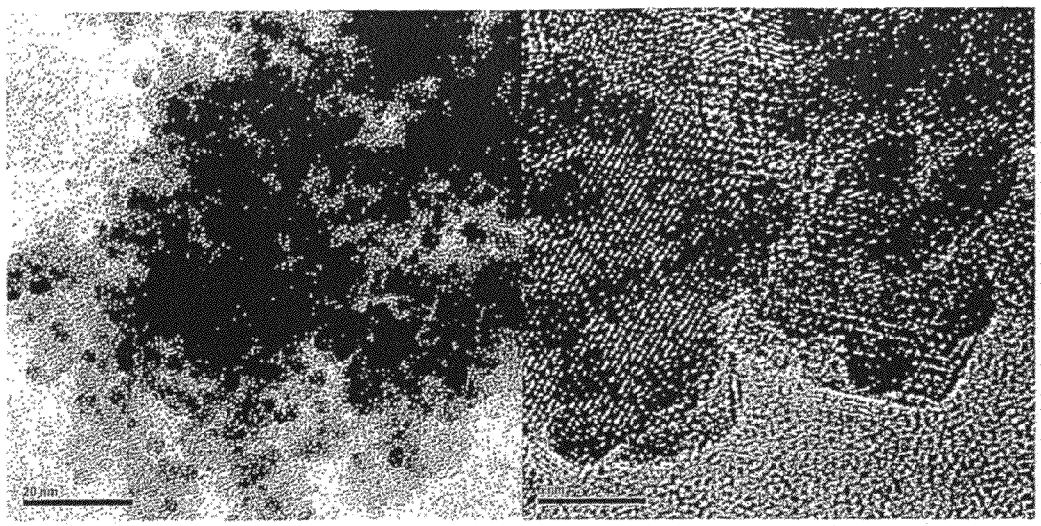
FIG. 3 shows TEM images of a 1% $Au/Fe_2O_3$ catalyst. Black dots are Au particles.
Figure 4:
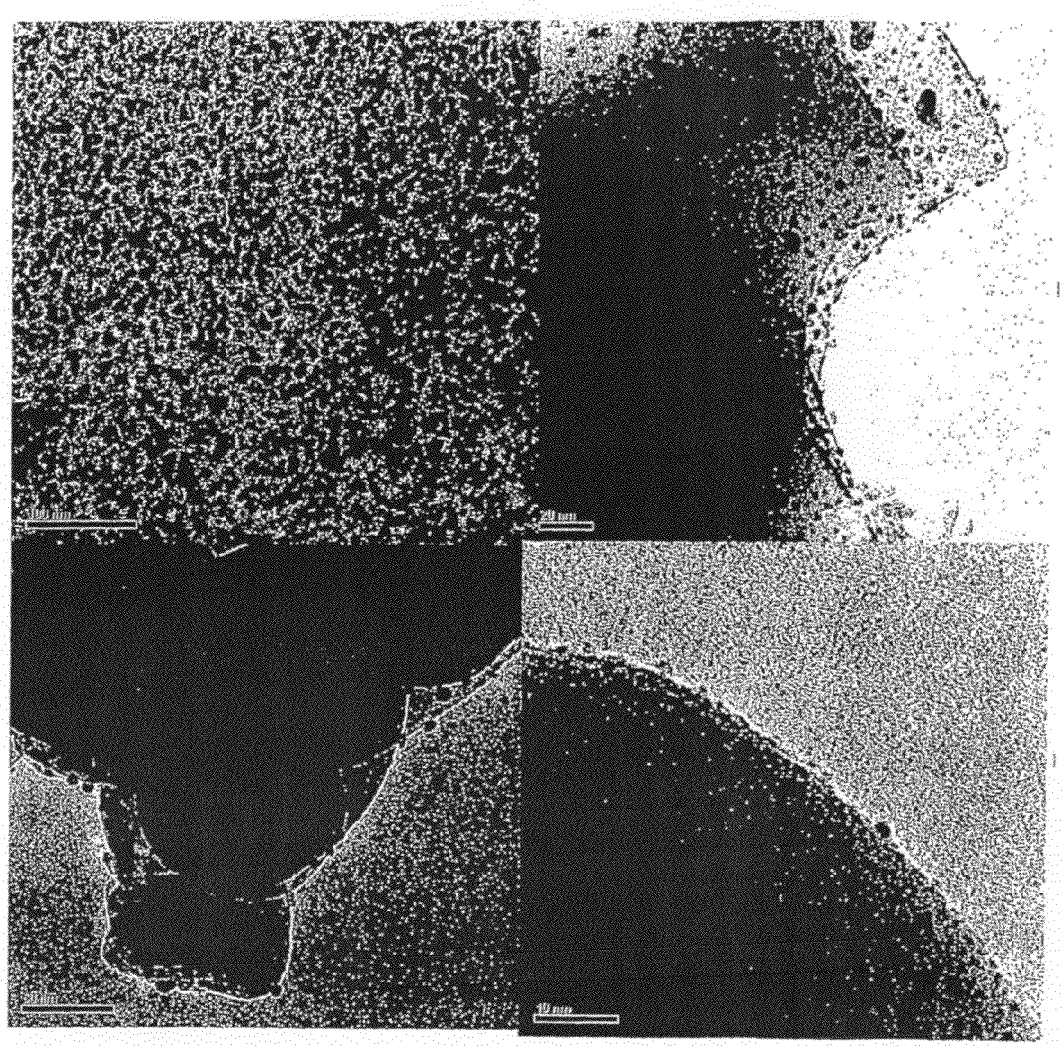
FIG. 4 shows TEM images of prepared catalysts: (A) $Au/SiO_2$, (B) $Au/CeO_2$, (C) $Au/Al_2O_3$, and (D) $Pt/TiO_2$. Black dots are Au or Pt particles.

FIG. 1 illustrates the general concept of the present invention. In certain embodiments, a metal precursor 110 is admixed with a capping agent 115 to form a solution 125. The metal precursor and capping agent can be soluble, insoluble or partially soluble in the solution. The catalyst solid support 145 is added followed by the addition of a reducing agent 135 to the solution 125 to form a reaction mixture 150. Sonication 160 is applied to the reaction mixture 150 to generate nanoparticles 170, which are deposited onto solid support 180 to produce catalyst 190. In certain other embodiments, the catalyst solid support 145 is added to the solution of 125 to form a reaction mixture 150. Sonication 160 is applied to the reaction mixture 150, and during the sonication, a reducing agent 135 is added so as to generate nanoparticles, which are deposited onto solid support 180 to produce catalyst 190.

The catalysts prepared in the present invention have the advantages of high activity, for example, in one aspect, the catalyst has a fast reaction rate at low temperatures and good stability over an extended period of use. The catalysts prepared according to the methods of the present invention also have a low content of halide anion residue, which minimizes the poisoning of the catalyst as well as having high stability against calcinations.

A. Catalytic Nanoparticles

In one aspect, the present invention provides a catalyst for conversion of carbon monoxide (CO). The catalyst is composed of a plurality of nanoparticles with dimensions ranging from about 2 nm to about 5 nm, preferably from 3-5 nm, a solid support and a capping agent. The metal particles and the capping agent are disposed onto the solid support. The capping agent can deposit on the surface of the nanoparticles and on the solid support.

In a preferred embodiment, the metal particles are noble metal particles. In an alternative embodiment, non-noble metals can be provided on the support. In yet another embodiment, noble metals can be combined in the particles with non-noble metals, preferably as an alloy, composite, or solid solution. Suitable metal particles include, but not limited to, Au, Pt or Pd nanoparticles.

The metal particles as used herein can be metal particles wherein each of the metal particles has a single phase or metal particulates where each of the metal particulates has multiple phases, a mixture, or aggregate of metal particles and metal particulates. The metal particulates include a plurality of metal atoms and/or crystallites. The particulates can be substantially pure material, an alloy of two or more elemental metals, or multicomponent metal particles. In one embodiment, at least some of the particles are provided as a composite or mixture, such as having two or more elemental metals, two or more alloys, or elemental metal and an alloy. All of the particles can have the same composition or they can be a mixture of particles with different compositions. In addition, some of the particles can be substantially pure elemental metals while others can be alloys of two or more elemental metals.

In another aspect, the metal particles are formed from group 8 to group 12 transition metals. Preferably, the metals are Ru, Os, Co, Rh, Ir, Ni, Pd, Pt, Cu, Ag, Au, Zn, Fe, Cd, Hg or combinations of metals. More preferably, the metals used in the present invention are noble metals including rhenium, ruthenium, rhodium, palladium, silver, osmium, iridium, platinum, gold or combinations of the metals. The metal particles typically have a dimension from about 1 nm to 10 nm, preferably the size of the metal particles are between 3 nm to 5 nm. A person of ordinary skill in the art will understand that particles of other sizes can also be prepared and used in the present invention.

In certain embodiments, the metal particles can be random aggregates of nanoparticles, such as colloidal nanoparticles. In other embodiments, nanoparticles can be cross-linked to produce particular aggregates of nanoparticles, such as dimers, trimers, tetramers or other aggregates. In certain alternative embodiments, the invention provides use of heterogeneous mixtures of aggregates of different size, while other embodiments can use homogenous populations of nanoparticle aggregates. In certain aspects, aggregates containing a selected number of nanoparticles (dimers, trimers, and the like) can be enriched or purified by known techniques, such as ultracentrifugation in sucrose gradient solutions.

Methods of cross-linking nanoparticles are known in the art (See, Feldheim, "Assembly of metal nanoparticle arrays using molecular bridges," The Electrochemical Society Interface, Fall, 2001, pp. 22-25) and can be used in various methods herein. Reactions of gold nanoparticles with linker compounds bearing terminal thiol or sulfhydryl groups are also known (Feldheim, 2001). In some embodiments, a single linker compound can be derivatized with thiol groups at both ends. Upon reaction with gold nanoparticles, the linker forms nanoparticle dimers that are separated by the length of the linker. In other embodiments, linkers with three, four or more thiol groups can be used to simultaneously attach to multiple nanoparticles (Feldheim, 2001). The use of an excess of nanoparticles to linker compounds prevents formation of multiple cross-links and nanoparticle precipitation.

The metal particles of the present invention are not limited to any particular shapes. Suitable shapes include regularly shaped, irregularly shaped or both. In some embodiments, the metal particles can adopt various shapes including spherical, cubical, cylindrical, oval, diamond, symmetrical polygonal, unsymmetrical polygonal, and other regular or irregular three-dimensional shapes. The metal particles can also be a mixture of particles of different shapes. In one preferred embodiment, the metal particles have spherical shapes.

The metal particles can be affixed to the support in any reasonable manner, such as affixed to the surface of the support, or alternatively, partially embedded within the support or both. In one embodiment, the particles are embedded within the support, and in another embodiment the particles are embedded below the surface.

B. Supports

In certain aspects, the present invention provides a support for the metal particles. Generally, any support capable of supporting and providing adequate dispersion for the particles can be used. Preferably, the support is stable in the local environment where the catalyst is to be used. The support has a surface area and/or porosity sufficient to provide dispersion of the metal particles. However, a support with increased porosity provides more intimate contact between reactants and catalytic material. In certain aspects, a separate phase support is used in the present invention. In some embodiments, the separate phase support is a solid support. The solid support used in the present invention can be silica gels, derivatized plastic films, glass beads, cotton, plastic beads, alumina gels, polymer resins, a zeolite, a carbon, an inorganic oxide, an inorganic hydroxide, a mixed inorganic hydroxides or mixed inorganic oxides.

In some embodiments, the support comprises one or more inorganic oxides or inorganic hydroxides. The inorganic oxides preferably include metal oxides. The inorganic hydroxides preferably include metal hydroxide. The metal oxides or metal hydroxides have one or more elements selected from group 2 to group 14 metals, preferably from aluminum, silicon, scandium, indium, tin, chromium, nickel, cobalt, manganese, titanium, zirconium, iron, zinc, copper and rare earth elements. In one embodiment, the inorganic oxide or inorganic hydroxide includes two or more of the metals elements, which are selected from the group consisting of aluminum, silicon, scandium, indium, tin, chromium, nickel, cobalt, manganese, titanium, zirconium, iron, zinc, copper and rare earth elements. Alternatively, the support is a multi-component, metastable oxide, which can include components of intermediate order, such as microcrystalline or nanocrystalline and/or may include components of polycrystalline materials. It is believed that the addition of modifier elements to the metal to form alloy increases the surface roughness of the metal particles. Since surface roughness is the total surface area divided by the geometric surface area, the increased roughness provides for an increase in the total surface area of the metal particles. The increased surface area provides for an increase in the number of active sites. The addition of modifier elements to metallic gold can also reduce the effect of poisoning.

In one embodiment of the metal oxide support, the support includes an oxide of titanium. In other aspects, the support includes an oxide of iron, an oxide of cerium, or an oxide of zirconium. In another embodiment, the support includes at least one oxide selected from the oxides of La, Y, Ce, Pr, or Nd. In a preferred aspect, the support includes silica or alumina.

In other embodiments of the present invention, the catalyst is a gold nanoparticle deposited on a metal oxide. Examples of metal oxides used in the catalyst of the present invention include, but not limited to, $CeO_2$, $ZnO$, $La_2O_3$, $M_2O_5$, $MgO$, $CaO$, $BaO$, $SrO$, $Yb_2O_3$, rare earth oxides, $TiO_2$, $ZrO_2$, $HfO_2$, $V_2O_5$, $CrO_3$, $MoO_3$, $WO_3$, $MnO_2$, $Fe_2O_3$, $CoO$, $NiO$, $CuO$, $ZnO$, $CdO$, $B_2O_3$, $Al_2O_3$, $Ga_2O_3$, $Eu_2O_3$, $Tl_2O$, $SiO_2$, $SnO_2$, $Sb_2O_3$, $Bi_2O_3$, zeolite, and the like.

In a preferred oxide support, the support comprises an oxide of aluminum, titanium, iron, silicon or cerium and at least one other element. Preferred elements include aluminum, silicon, scandium, indium, tin, chromium, nickel, cobalt, manganese, titanium, zirconium, iron, zinc, copper and rare earth elements.

In another embodiment, the support of the present invention can be a polymer support. A polymer support can be cross-linked polymer resin beads or non cross-linked polymers. The resin beads can be a hydrocarbon polymer, a modified hydrocarbon polymer with functional groups attached to the polymer or a functionalized polymer. A preferred support can also have reactive functional groups for interacting with the metal particles and capping agents. These functional groups include, but not limited to, hydroxyl, carboxyl, amino, thiol, aldehyde, halogen, nitro, cyano, amido, urea, carbonate, carbamate, isocyanate, sulfone, sulfonate, sulfonamide, sulfoxide, and the like. Examples of polymer resin include, but are not limited to, polystyrene, polyamide, polystyrene resin grafted with polyethylene glycol, polydimethyl-acrylamide resin and the like.

In yet another embodiment, the support of the present invention can be a zeolite. A zeolite can be a molecular sieve with various Si/Al ratios. Examples of zeolites include, but are not limited to, molecular sieve 3A, 4A, 5A, 13X, SAPO-11, SAB-15, MCM41, and the like.

In yet another embodiment, the support of the invention can be a carbon material. Suitable carbon materials include, but are not limited to, amorphous carbon or crystalline carbon, carbon nanotubes, commercial activated carbon, and the like.

C. Capping Agent

In certain aspects, the catalysts of the present invention include a capping agent in contact with the nanoparticles. In other aspects, the capping agents are deposited on the solid support. Capping agents include compounds having the general formula $(R)_n$-X, where X is an atom or functional group capable of binding to the surface of the nanoparticles and R is a molecular structural motif. The term "binding" refers to an interaction that associates the capping agent with the nanoparticles. Such interactions can include, ionic, covalent, dipolar, dative, quadrupolar or Van der Walls interactions. Each R group is independently selected from hydrogen, an aryl group having between 1 and 20 carbon atoms or an alkyl group having between 1 and 20 carbon atoms. Alternatively, the R group can be part of a polymer structure (e.g., co-polymer, dendrimer, and the like). Examples of polymers include, but are not limited to, polyamino acids, polypeptides, polyolefins (e.g. polyethylene, polypropylene), polyester, polycarbonate, polyacrylate, copolymers and branched structures thereof, wherein the repeating units of the polymers are optionally substituted with from 1-3 functional groups selected from hydroxyl, amino, alkylamino, dialkylamino, thiol, alkylthiol, halo, amido, carbamoyl, alkoxy, —CN, carboxyl, alkylcarboxyl, arylcarboxyl, sulfonyl, sulfonylamido, alkylsulfonyl, arylsulfonyl, alkyl and aryl, wherein the alkyl and aryl are further optionally substituted with from 1-3 functional groups selected from hydroxyl, amino, alkylamino, dialkylamino, thiol, halo, amido, carbamoyl, alkoxy, —CN, carboxyl, alkylcarboxyl and arylcarboxyl. Generally, the polymers have a molecular weight greater than 1,000. The alkyl group can have functional groups attached to the alkyl group or within the alkyl chains. The aryl group can have functional group substituents or functional groups within the aromatic ring system. The functional groups include, but are not limited to, a nitrogen atom, an oxygen atom, a sulfur atom, a phosphorus atom, a carboxylate, a sulfonate, an amide, an alkene, an amino, an amine, an alcohol, a hydroxyl, a thioether, a phosphate, an alkyne, an ether, a nitro, a mercapto, a phosphine, a halide, a silyl, a carbamoyl, a cyano, or a quaternary ammonium group. X can be an atom that includes, but is not limited to, nitrogen, carbon, oxygen, sulfur, and phosphorus. Alternatively, X can be a functional group, such as a leaving group, that includes, but is not limited to, a carboxylate, a sulfonate, an amide, an alkene, an amine, an alcohol, a hydroxyl, a thioether, a phosphate, an alkyne, an ether, or a quaternary ammonium group. Examples of capping agents include, but are not limited to, alcohols, alkenes, alkynes, thiols, ethers, thioethers, phosphines, amines, amides, carboxylates, sulfonates, carboxylic acids, amino acids, carboxylates of amino acids, cyclodextrins ($\alpha$, $\beta$ or $\gamma$), quaternary ammonium compounds, and a polymer species thereof.

In some embodiments, the capping agent can be an alcohol. Alcohols that can be used include, n-alcohols having between 1 to 20 carbon atoms. An example of such an n-alcohol is 1-octanol. In other embodiments, the capping agent can be an alkene. Alkenes that can be used include alpha-olefins having between 1 to 20 carbon atoms, or olefins with unsaturated chains. An example of such an alkene is 1-octene. In another embodiment, the capping agent can be a thiol. Suitable thiols include thiols having between 1 to 20 carbon atoms. An example of such a thiol is 1-thiooctanol. In yet other embodiments, the capping agent can be an amino acid or a salt of amino acid. The amino acids used include naturally occurring amino acids or non-naturally occurring amino acids. The amino acids can be naturally occurring $\alpha$-amino acids, $\beta$-amino acids or amino acids with amino substituent at other positions. Amino acids used can include amino acids having between 2 to 30 carbon atoms. An example of such an amino acid is an $\alpha$-amino acid, such as lysine. Other amino acids useful as capping agents include, proline, serine, threonine, tryptophan, valine, histidine, glysine, phenylalanine, asparagines, arginine, glutamine, and the like.

II. Methods

The present invention also provides a method for the preparation of a highly dispersed catalyst. The method includes reacting a metal precursor with a reducing agent in the presence of a capping agent; meanwhile applying sonication to the reaction mixture to generate the dispersed metal particles; and depositing the metal particles onto a solid support. The catalyst generated can be further separated and purified.

Nanoparticles can be prepared using the methods described herein. The reactants need not be added in any order for the preparation of the catalyst. In one embodiment, sonication/or ultrasound is applied to the reaction mixture during the reduction period. Alternatively, sonication/or ultrasound can also be applied at any other necessary stage of the reaction process. The metal precursor, capping agent and reducing agent can be soluble, insoluble or partially soluble in the reaction media. In one embodiment, a metal precursor and a capping agent are dissolved in a solvent to form a solution. A reducing agent is added to the solution and sonication is applied to the resulting reaction mixture. In another embodiment, the metal precursor is soluble or partially soluble in the solvent, the capping agent is partially soluble and the reducing agent is partially soluble in the solvent. The reaction can be carried out at a temperature from about −63° C. to about 85° C. Preferably, the reaction is carried out at the ambient temperature of about 20° C. to 30° C.

The catalyst can be isolated through filtration (e.g. using a nanoporous membrane), centrifugation, ultracentrifugation, precipitation or dialysis. This step removes nearly all residual molecules like salt ions, pollutants, excess functionalizing agent, and most of the solvent. Optionally, several washing steps can be added. At the same time, the nanoparticles are purified by removing smaller-sized particles and/or larger aggregates, which may be present due to impurities. In some instances, pellets or precipitates may need to be redissolved in appropriate solvents, if necessary, supported by ultrasonic activation. The catalyst can be optionally purified by washing with a solvent. In one embodiment, washing can be accomplished by immersing the newly formed catalyst in a continuously moving stream of water which leaches out the undesirable salts and other impurities that may reduce the activity of the catalyst, leaving essentially pure catalyst. The pH, temperature, and duration of the wash water may influence the physical properties of the catalyst, such as surface area and pore volume.

The solvent used in the present invention can be polar solvent or less polar solvent or a mixture of solvents. In one embodiment, the polar solvents used include, but are not limited to, water, alcohol such as methanol and ethanol, dimethylformamide (DMF), dimethylsulfoxide (DMSO), dichloromethane, tetrahydrofuran (THF), ether, dioxane, chloroform, and combinations thereof. The less polar solvents used include, but are not limited to, toluene, benzene, petroleum ether, pentane, hexanes and cycloalkanes. The solvents used can also be mixtures or combinations of different solvents. For example, a mixture of solvents, such as a mixture of alcohol/dichloromethane, toluene/dichloromethane, hexane/dichloromethane, THF/dichloromethane, THF/alcohol, THF/toluene, THF/hexane, and the like, can be used in the present invention. Those of skill in the art will know of other solvent systems suitable to use in the invention.

The dimensions of the nanoparticles can be controlled by reaction conditions, the capping agent used and the duration of the sonication. The reaction conditions used to control the particle size can include, for example, the temperature, pressure, metal precursor concentration, capping agent concentration, solvent, precursor composition and capping agent composition. In one embodiment, under a certain reaction temperature, the size of the nanoparticles can be controlled by altering the type and amount of the capping agent used. Alternatively, the size and distribution of the nanoparticles can be controlled by altering a combination of conditions and reagents used. In one embodiment, the ratio of the capping agent to metal precursor is about 1:1. It is believed that the capping agent can aid in controlling the dimensions of the formed nanoparticles by inhibiting growth of the nanoparticles. The capping agent may also prevent reactive degradation of the nanoparticles when exposed to water, oxygen and other chemical contamination.

In certain aspects, the capping agent can interact with a metal precursor or a metal particle during formation of the nanoparticle to assist in controlling the growth of the particle. The capping agent can bond covalently to the particle surface, or stick through weak interactions, such as hydrogen bonding or Van der Walls interactions. The capping agents can physically absorb to the particle surface. In one embodiment, capping of the particle surfaces can occur through a combination of organic ligands and inorganic small molecules. Functional groups of the capping agents, such as nitrogen, oxygen or sulfur can bond to the surface in some instances. Additionally, the capping agent can assist in solubilizing the metal precursor. Alternatively, two or more kinds of capping agents can be added to the reaction mixture. In one embodiment, a mixture of metal precursors may be added to the reactor for particle formation.

In another embodiment, nanoparticles can be formed by heating a metal precursor in the presence of a capping agent. The metal precursor and capping agent can be heated in vacuum or at a pressure greater than 1 atm in a reaction vessel. Heating of the metal precursor results in the thermal degradation of the metal precursor, which in turn leads to the formation of nanoparticles. The precursor can degrade through a free radical mechanism, or it can degrade through thermolysis. In one embodiment, a free radical initiator can be added to the reaction. The preferred metal precursor used in such instances is a metal organic compound.

The metal precursor is preferably a metal compound, which has a central main group, transition, lanthanide, or actinide metal atom or atoms bonded to a bridging atom (e.g., N, O, P or S) that is in turn, is bonded to one or more atoms or an organic radical. Examples of the metal atom include, but are not limited to, B, Mg, Al, Si, Ti, Fe, Co, Ni, Cu, Zn, Ge, Zr, Nb, Mo, Ru, Rh, Pd, Cu, Zn, Cd, Ag, Sn, Ce, Hf, Ta, W, Re, Os, Ir, Pt and Au. Such compounds can include metal oxide, metal alkoxides, β-diketonates, carboxylates, oxalates, citrates, metal hydrides, thiolates, amides, nitrates, carbonates, cyanates, sulfates, fluorides, bromides, chlorides, sulfide and hydrates thereof. The metal precursor can also be an organometallic compound, wherein a central metal atom is bonded to one or more carbon atoms of an organic group. In one embodiment, the metal atoms include rhenium, ruthenium, rhodium, palladium, silver, osmium, iridium, platinum, gold or combinations of different metals.

Alternatively, the metal precursor can be a compound having the formula $L_nM_mX_q$, where L is H, $NH_2$, Na or K; M is a metal; X is a ligand including a halide, a carbonate, a nitrate or a sulfate; n, m and q are selected integers from 1 to 8 such as 1, 2, 3, 4, 5, 6, 7 and 8. The metal can be a group 7 to group 12 (such as group 7, 8, 9, 10, 11 or 12) element or combinations of different elements. Examples of the metal atom include, but are not limited to, B, Mg, Al, Si, Ti, Fe, Co, Ni, Cu, Zn, Ge, Zr, Nb, Mo, Ru, Rh, Pd, Cu, Zn, Cd, Ag, Sn, Ce, Hf, Ta, W, Re, Os, Ir, Pt and Au. In one embodiment, the metal atoms include rhenium, ruthenium, rhodium, palladium, silver, osmium, iridium, platinum, gold or combinations of different metals.

Multicomponent metal particles of the present invention can be prepared from mixed metal (hetero-metallic) precursors or, alternatively, from a mixture of single metal (homo-metallic) precursors.

The use of multiple single-metal precursors has the advantage of flexibility in designing precursor rheology as well as product stoichiometry. Hetero-metallic precursors, on the other hand, can offer access to metal systems whose single metal precursors have undesirable solubility, volatility or compatibility.

The reducing agent used in the present invention can be a metal hydride, hydrogen gas, a catalytic hydrogenation system or a metal/acid reduction system. The metal hydride reducing agents include, but are not limited to, borohydride, such as $NaBH_4$, $KBH_4$, $ZnBH_4$, $NaBH_3CN$ and $L_1$-s-$Bu_3BH$; aluminum and tin compounds, such as lithium aluminum hydride and $SnCl_2$/pyridine; borane complexes, such as $B_2H_6$ and dimethyamine borane. Catalytic hydrogenation systems include, but not limited to, $H_2$/Raney Ni; $H_2$/Pt; $H_2$/Pd-carbon; $H_2$/Lindlar; $H_2$/Rh complex and $H_2$/Rh-carbon. The metal/acid reduction systems include, but are not limited to, Zn/HCl; Zn/HOAc and $SnCl_2$/HCl.

The qualities of the dispersion generally depend on the process for the formation of the dispersion. In dispersions, besides chemical/physical forces applied by the dispersant and other compounds in the dispersion, mechanical forces can be used to separate the primary particles, which are held together by Van der Waals forces and other short range electromagnetic forces between adjacent particles. In particular, the intensity and duration of mechanical forces applied to the dispersion significantly influences the properties of the dispersion. Mechanical forces can be applied to the powders prior to dispersion in a solvent. Alternatively, mechanical forces, such as shear stress, can be applied as mixing, agitation, jet stream collision and/or sonication/ultrasonication following the combination of a powder or powders and a liquid or liquids. In one embodiment of the present invention, the components can be mixed by a stir bar mixing or a combination of stir bar mixing and sonication/ultrasonication. With stir bar mixing, the suspension of support and solution are mixed with a stir bar and sonicated/ultrasonicated.

Nanoparticles can be incorporated into the solid support by various methods, such as ion exchange, impregnation, or physical admixture. For example, the metal particles can be dissolved or suspended in a liquid, and the high surface area support can be mixed with the liquid having the dispersed or suspended metal particles. The dissolved or suspended metal particles can be adsorbed onto a surface of the support, or absorbed into the support. The metal particles can also be deposited onto a surface of the support by removing the liquid, such as by evaporation so that the metal particles remain on the support. The liquid can be substantially removed from the support by heating the support at a temperature higher than the boiling point of the liquid or by reducing the pressure of the atmosphere surrounding the support.

In one embodiment of the present invention, depositing of the metal particles onto the solid support can be accomplished through mixing the solid support with a solution, preferably an aqueous solution, of appropriate metal particle colloids. The mixing can be performed at about ambient temperature or at elevated temperatures, e.g., through reflux. After incorporation of the metal particles, the metal particles solution-solid support mixture can optionally be filtered and washed with water.

The methods of the present invention offer several advantages over the convention methods as exemplified in Example 1, Table I. The catalysts prepared by the methods of the present invention have a high activity at low temperatures and a well-defined particle size and distribution. The reaction can be carried out with a low catalyst loading. The methods of the present invention provide a simple and versatile approach for facile depositing metal particles on various solid supports.

The present invention also provides a use of the catalyst in the selective removal of carbon monoxide (CO). The reaction can be carried out under a variety of conditions. The reaction can be carried out in a temperature range from about −63° C. degree to about 150° C. Preferably, the reaction is carried out between 0° C. to 80° C. In one embodiment, a catalyst loading of about 1 wt % to about 5 wt % can be used. Alternatively, other catalyst loading may be contemplated. In one embodiment of the present invention, 5 wt % of $Au/Fe_2O_3$ is used to oxidize the CO in a reactant gas. A gas flow rate of about 10 ml/min to about 80 ml/min can be used. A person of ordinary skill in the art understands that other reaction conditions can also be used to effect the efficient conversion of CO. Using the catalysts of the present invention, in certain instances, the CO concentration in air is reduced to less than 100 ppm. In certain other instances, the CO concentration in air is reduced to less than 50 ppm. In yet other instances, the CO concentration in air is reduced to less than 10 ppm. In still other instances, the CO concentration in air is reduced to less than 5 ppm.

Figure 5:
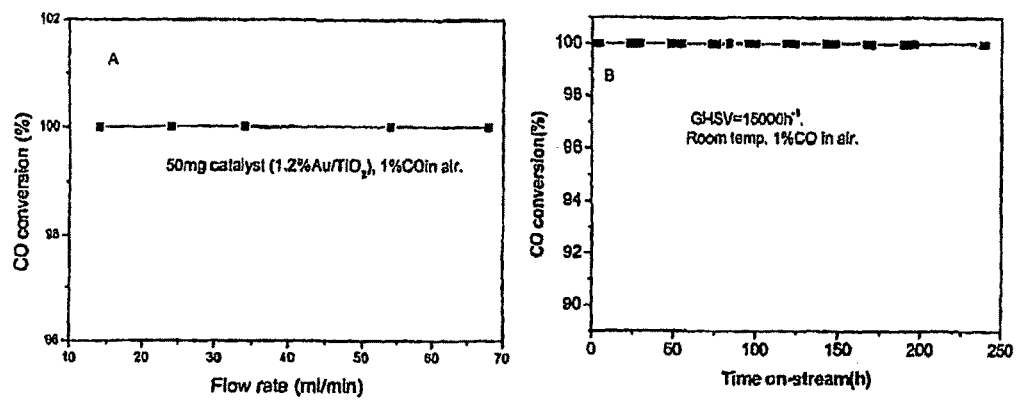
FIG. 5 shows a catalytic oxidation of 1% CO in air on 1.2% $Au/TiO_2$ catalyst under various flow rates (A), and catalyst life test results (B).

FIG. 5 illustrates the catalytic oxidation of CO in air using 1-1.2% $Au/TiO_2$ catalyst under various flow rates. Quantitative conversion of CO is accomplished under a flow rate from 15 ml/min to about 70 ml/min. Surprisingly, the catalysts exhibit extremely high stability over a period of more than 230 hours at room temperature. No decreasing of reactivity is observed.

Figure 6:
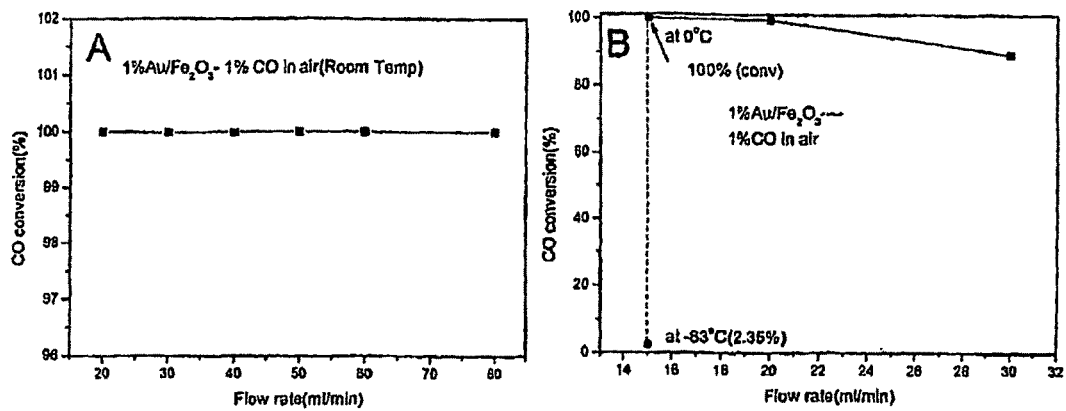
FIG. 6 shows catalytic oxidation of 1% CO in air on 1% $Au/Fe_2O_3$ catalyst: (A) catalyst life test result catalyst test result at room temperature (23° C.), and (B) under various temperature and flow rates.

FIG. 6 illustrates the oxidation of CO in air using 1% $Au/Fe_2O_3$ catalyst at room temperature (23° C.). Quantitative conversion of CO is observed at a gas flow rate from about 20 ml/min to about 80 ml/min. Surprisingly, the catalyst also maintains activity at a temperature as low as −63° C. At a temperature of 0° C., the catalyst has a remarkable activity of CO oxidation, for example, quantitative removal of CO is achieved at a flow rate of about 15 ml/min in the presence of a 1% $Au/Fe_2O_3$ catalyst. With the increasing of flow rate, only a slight drop of CO oxidation activity is observed at this temperature. The catalyst system offers the advantage of the capability of being used in a low temperature environment. In one embodiment, the catalyst of the present invention is used in a breathing device, such as a mask filter.

Figure 7:
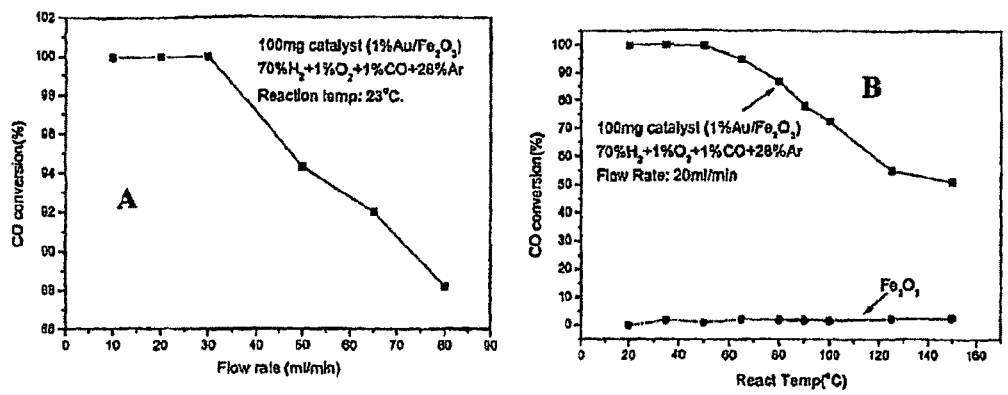
FIG. 7 shows selective oxidation of CO on 1% $Au/Fe_2O_3$ catalyst using a reactant gas containing 70% $H_2$, 1% $O_2$, 1% CO and 28% Ar; (A) CO conversion vs. flow rate, and (B) catalyst life test.

FIG. 7 illustrates the removal of CO in a reactant gas on 1% $Au/Fe_2O_3$ catalyst at an ambient temperature. FIG. 7B illustrates that the activity of the catalyst is a function of temperature and flow rate. The reaction can be carried out in a flow rate ranging from about 10 ml/min to about 80 ml/min. A preferred flow rate is between about 10 ml/min to about 30 ml/min. As shown in FIG. 7B, the catalyst of the present invention exhibits high activity over a wide temperature range from about 20° C. to about 150° C. At a certain flow rate, the reactivity of the catalyst can be maximized by adjusting the reaction temperatures. For example, at a flow rate of 20 ml/min, a preferred reaction temperature ranges from about 20° C. to about 80° C.

Figure 8:
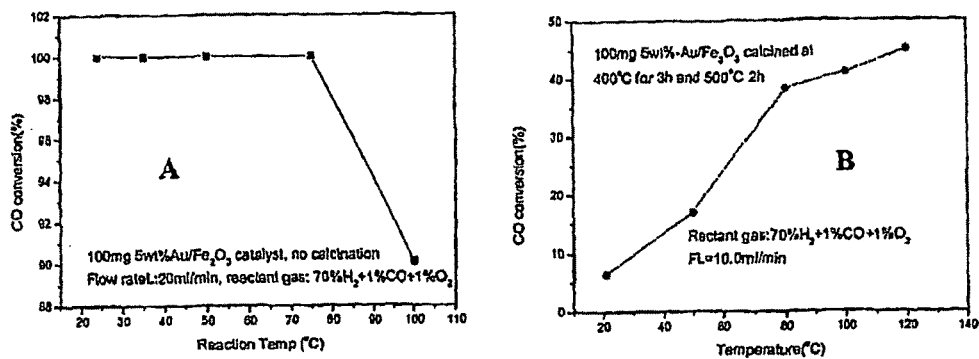
FIG. 8 shows a comparison of selective oxidation of CO on 5% $Au/Fe_2O_3$ catalysts with or without calcinations of the catalysts using reactant gas containing 70% $H_2$, 1% $O_2$, 1% CO and 28% Ar. (A) the catalyst is not calcined, (B) The catalysts is calcined at 400° C. and 500° C. successively. The catalyst was prepared according to the deposition-precipitation method reported by Londo P et al (Chem. Commun., 2005, 3385).

FIG. 8A illustrates the oxidation of CO in the presence of about 5 wt % of $Fe_2O_3$ catalyst in the absence of calcination treatment. FIG. 8B illustrates the activity of the catalyst after calcination treatment. Surprisingly, the catalyst prepared by co-precipitation method loses low temperature activity after calcinations. For example, at 20° C., only 5% of CO is removed using the catalyst after calcinations. To achieve 45% of CO conversion, the reaction needs to be carried out at about 120° C. The results reveal that calcinations decrease the activity of the catalyst, which is in contrast with the prior art that calcinations actually increase the activity of the catalyst. The catalyst was prepared according to the deposition-precipitation method reported by Londo P et al (Chem. Commun., 2005, 3385).

Figure 9:
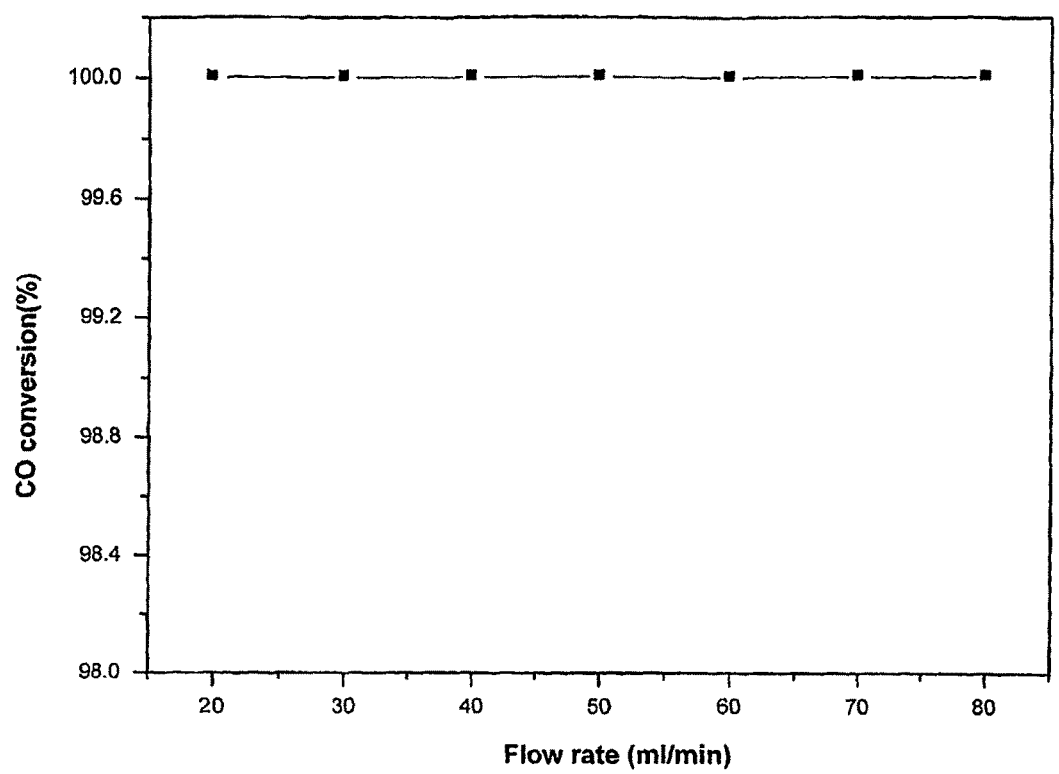
FIG. 9 shows selective oxidation of CO at 50° C. in the presence of $H_2$ and $CO_2$ on 5% $Au/Fe_2O_3$ prepared by the method of the present invention. The catalyst is prepared by the method of the present invention. The reactant gas contains 77% $H_2$, 2% $O_2$, 1% CO and 20% $CO_2$. $Fe_2O_3$ is obtained from Aldrich.
Figure 10:
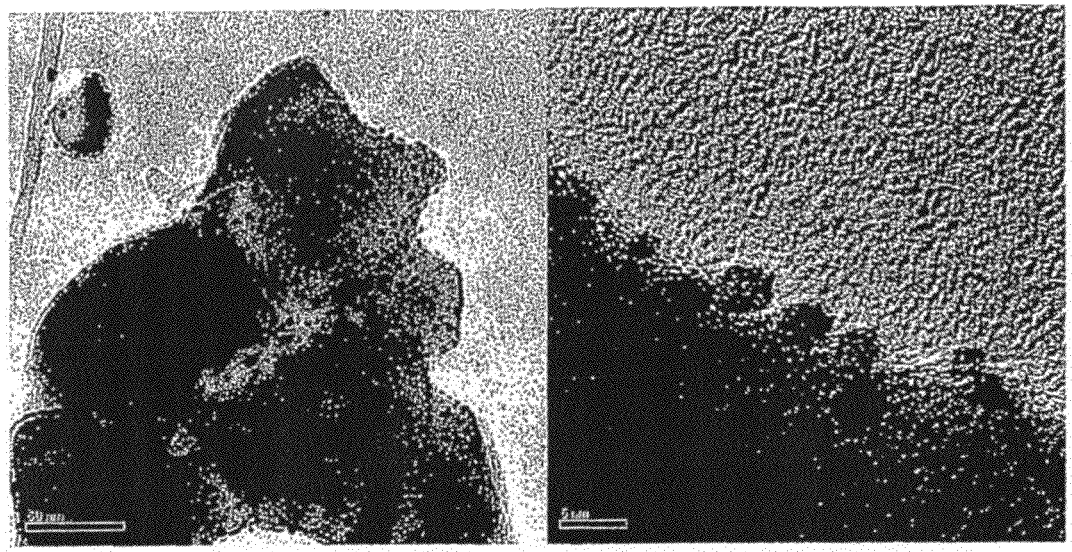
FIG. 10 shows TEM images of the 5% $Au/Fe_2O_3$ catalyst used in FIG. 9. Black dots are Au particles.

The catalyst of the present invention is also active in removal of CO in the presence of $H_2O$ and/or $O_2$. FIG. 9 illustrates a selective oxidation of CO in a mimicked PEM Fuel cell condition (containing 20% $CO_2$, 1% CO, 77% $H_2$ and 2% $O_2$) using the catalyst of the present invention. For example, quantitative conversion of CO is achieved at 50° C. under a flow rate from about 10 ml/min to about 80 ml/min using 100 mg loading of 5% $AuFe_2O_3$ catalyst.

EXAMPLES

Example 1

Preparation of Au Catalyst

The Au catalysts were prepared using $HAuCl_4$ as a precursor, $NaBH_4$ as a reduction agent and amino acid as a capping agent. During the reduction period, sonication was applied (e.g. 20 seconds). Next, the catalyst was separated using centrifuge and washed with deionized water. The advantages of the method are low reaction temperatures, such as room temperature, fast reaction rate and high efficiency for metal particle deposition and suitability for various catalyst supports. The catalytic activities of the catalysts for CO oxidation in air and in the presence of $H_2$, respectively, are comparable to the best prior art results.

TEM images of the catalysts of $Au/TiO_2$, $Au/Fe_2O_3$, $Au/SiO_2$, (B) $Au/CeO_2$, (C) $Au/Al_2O_3$, $Pt/TiO_2$ are presented in FIGS. 2, 3, 4 and 10, respectively. The Au colloids are 3-5 nm in diameter in the solution (FIG. 2A). After deposited onto $TiO_2$ (FIG. 2B), or $Fe_2O_3$, or other catalyst supports, there is almost no change in size for Au particles. Also, these Au particles are highly dispersed on these catalyst supports (FIG. 2B, FIG. 3 and FIG. 4, and FIG. 10). The method is versatile for preparation of many catalysts with high metal particle dispersion.

Example 2

Activity Comparison of the Catalysts of the Present Invention with the Best Literature Results

TABLE 1

A comparison of preparation conditions and results of our catalyst with best literature results.

| Method | Temp (° C.) | Time (hr) | Au particle size (nm) | Catalyst loading (%) | CO content (ppm) after reaction in reactant gas[a] | CO in air[b] (ppm) |
|---|---|---|---|---|---|---|
| ICES (Au/Fe$_2$O$_3$) | RT | 0.5 | 3-5 | 1 | 70-80 | <10 |
| ICES (Au/Fe$_2$O$_3$) | RT | 0.5 | 3-5 | 5 | <100 | <10 |
| Co-P[c] (Au/Fe$_2$O$_3$) | 80 | 2-3 | 3.7 | 5 | 50 | no data[d] |
| D-P[c] (Au/TiO$_2$) | 80 | 4-8 | 1-3.3 | 6-8 | poor[c] | |
| P[c] (Au/Fe$_2$O$_3$) | RT | ~1 | 2-3 | 3 | no | <10 |

[a]Reactant gas contains 1% CO, 1-2% O$_2$, 77% H$_2$, 20% CO$_2$.
[b]Reactant gas is 1% CO in air (10,000 ppm).
[c]"Co-P" refers to Co-precipitation method (Landon, P., et al. Chem. Commun. 2005, 3385); "D-P" refers to Deposition-precipitation method (Zanella, R. et al., J. Phys. Chem. B 2002, 106, 7634); "P" refers to Precipitation method (Cheng, W. H. et al., Catalysis Today, 2004, 97, 145).
[d]No catalytic data reported in Landon, et al, One sample was prepared and tested by the inventors.

Example 3

Oxidation of CO in Air for Mask Application

The oxidation of CO in air on Au/TiO$_2$ and on 1% Au/Fe$_2$O$_3$ are presented in FIG. 5 and FIG. 6, respectively. Complete removal of CO can be achieved at room temperature for the two catalysts under high space velocity, and at 0° C. for 1% Au/Fe$_2$O$_3$ catalyst. However, at −63° C., the CO conversion decreased to ca. 2.35% from 100% on 1% Au/Fe$_2$O$_3$ (FIG. 6B). The test shows that the life of the catalyst is at least longer than 200 hrs. Further testing of the stability was not conducted. Both 1% Au/TiO$_2$ and 1% Au/Fe$_2$O$_3$ are suitable for the application in mask and other breathing devices.

Example 4

Selective Oxidation of CO in the Presence of Hydrogen (Dry Reactant Gas) for Stationary Application Catalyst Au/Fe$_2$O$_3$ was prepared according to the method of the present invention and was found to exhibit high catalytic activity. Carbon monoxide can be completely removed from the reactant gas at a temperature below 50° C. using 1% of catalyst loading. The results are also shown in FIG. 7.

The catalyst Au/Fe$_2$O$_3$ was also prepared by a co-precipitation method (Landon, P. et al. Chem. Commun, 2005, 3385). The prior art has emphasized that the two-stage calcination of the catalyst at 400° C. and 500° C. is crucial for 100% conversion of CO and low selectivity for H$_2$ oxidation. A similar experiment was conducted with the catalyst prepared by the co-precipitation method and found a significant increase in the dimension of the metal particles with decreased activity after the 2-stage calcinations, for example, the Au particles are 15-20 nm in diameter and the CO conversion in 70% H$_2$ is only about 50% (FIG. 8B). However, the inventors have found that the catalyst prepared by the co-precipitation method exhibits very high catalytic activity without calcinations. For example, CO can be completely removed at room temperature (FIG. 8A).

Example 5

Selective Oxidation of CO in the Presence of H$_2$, CO$_2$ and H$_2$O (Humid Reactant Gases) for Reformer-PEFC Application For this reaction, the highest CO conversion is almost 100%, and minimum CO concentration is below 100 ppm (below the detection limit of the detector). These results are comparable to the best prior art results up to date (Landon, P. et al. Chem. Commun, 2005, 3385). In the presence of trace H$_2$O, the CO conversion is still above 99%, but the selectivity of O$_2$ may be increased.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of preparing a highly dispersed catalyst, said method comprising the following sequential steps in order:
   a) generating a reaction mixture comprising a metal precursor compound, an amino acid capping agent, and a metal oxide solid support selected from the group consisting of Fe$_2$O$_3$, TiO$_2$, CeO$_2$, Al$_2$O$_3$, ZnO and CuO;
   b) applying sonication to the reaction mixture before and while
   adding a reducing agent to the reaction mixture to generate a plurality of metal colloidal particles; and
   c) depositing the plurality of metal colloidal particles onto the solid support to prepare a highly dispersed catalyst under sonication.

2. The method of claim 1, further comprising: separating and purifying the catalyst.

3. The method of claim 1, wherein the catalyst is prepared at a temperature from about 0° C. to about 80° C.

4. The method of claim 1, wherein the metal precursor compound is a metal oxide, a metal halide, a metal nitrate, a metal sulfate, a metal sulfide or a hydrate thereof.

5. The method of claim 1, wherein the metal precursor compound is selected from the group consisting of $LAuX_4$, $L_2MX_2$, $L_2MX_4$, $L_3RhX_6$ and $L_2M'X_6$ wherein L is a member selected from the group consisting of H, $NH_2$, K and Na; M is a member selected from the group consisting of Ni, Pd and Pt; M' is a member selected from the group consisting of Ru, Ir and Os; and X is a halide.

6. The method of claim 5, wherein the metal compound precursor is $HAuCl_4$.

7. The method of claim 1, wherein the reducing agent is selected from the group consisting of a metal hydride, a catalytic hydrogenation system and a metal/acid system.

8. The method of claim 7, wherein the metal hydride is selected from the group consisting of $LiAlH_4$ and a metal borohydride.

9. The method of claim 8, wherein the metal borohydride is selected from the group consisting of $NaBH_4$, $KBH_4$, $Zn(BH_4)_2$, $B_2H_6$, $NaBH_3CN$ and $Li$-$s$-$Bu_3BH$.

10. The method of claim 1, wherein the sonication is generated from a sonication device.

11. The method of claim 1, wherein the metal colloid particles have a dimension from about 2 nm to about 5 nm.

12. The method of claim 1, wherein the metal colloid particles have a shape selected from the group consisting of spherical, cubical, cylindrical, oval, and othrer regular and irregular three-dimensional shapes.

13. The method of claim 1, wherein the metal colloid particles are formed from a metal selected from the group consisting of Au, Pt, Pd, Ag, Ni, Ru, Rh, Ir, Os, Fe, Co and Cu.

14. The method of claim 13, wherein the metal colloid particle is formed from Au.

15. The method of claim 1, wherein the metal colloid particles are formed from a metal selected from the group consisting of Au, Pt, Pd, Ag, Ru, Rh, Ir, and Os.

16. A method of preparing a highly dispersed catalyst, said method comprising the following sequential steps in order:
   a) contacting a metal precursor compound with an amino acid capping agent and a metal oxide catalyst support selected from the group consisting of $Fe_2O_3$, $TiO_2$, $CeO_2$, $Al_2O_3$, ZnO and CuO to generate a reaction mixture;
   b) applying sonication to the reaction mixture before and while adding a reducing agent to the reaction mixture while the reaction mixture is being sonicated to generate a plurality of metal colloidal particles; and
   c) depositing the plurality of metal colloid particles under sonication onto a the metal oxide catalyst support to prepare a highly dispersed catalyst.

17. The method of claim 16, wherein the metal colloid particles are formed from a metal selected from the group consisting of Au, Pt, Pd, Ag, Ru, Rh, Ir, and Os.

* * * * *